US008042291B2

(12) United States Patent
Clegg

(10) Patent No.: US 8,042,291 B2

(45) Date of Patent: Oct. 25, 2011

(54) SCENT RELEASING PICTURE CHANGER

(76) Inventor: Timothy Clegg, Manhattan Beach, CA (US)

( * ) Notice: Subject to any disclaimer, the term of this patent is extended or adjusted under 35 U.S.C. 154(b) by 0 days.

(21) Appl. No.: 13/006,290

(22) Filed: Jan. 13, 2011

(65) Prior Publication Data

US 2011/0107632 A1 May 12, 2011

Related U.S. Application Data

(62) Division of application No. 11/827,833, filed on Jul. 13, 2007, now Pat. No. 7,918,043.

(51) Int. Cl.

| | |
|---|---|
| ***G09F 11/00*** | (2006.01) |
| ***G09F 7/00*** | (2006.01) |
| ***G09F 1/10*** | (2006.01) |
| ***G09B 19/00*** | (2006.01) |
| ***G09B 23/02*** | (2006.01) |
| ***G09B 25/00*** | (2006.01) |

(52) U.S. Cl. ................ 40/491; 40/490; 40/124; 40/488; 434/404; 434/402; 434/104; 434/206

(58) Field of Classification Search .................... 40/491, 40/490, 124, 488; 434/404, 402, 104, 206
See application file for complete search history.

(56) References Cited

U.S. PATENT DOCUMENTS

| | | | | |
|---|---|---|---|---|
| 3,659,367 | A * | 5/1972 | Yumoto | 40/491 |
| 5,778,578 | A * | 7/1998 | Drapcho et al. | 40/491 |
| 6,162,457 | A * | 12/2000 | Martz | 424/448 |
| 7,127,841 | B1 * | 10/2006 | Weber | 40/124.03 |
| 7,637,044 | B2 * | 12/2009 | Hluchan | 40/492 |

* cited by examiner

*Primary Examiner* — Joanne Silbermann
*Assistant Examiner* — Syed A Islam
(74) *Attorney, Agent, or Firm* — Clement Cheng

(57) ABSTRACT

An aroma visual message carrier is shaped into a card device for carrying multisensory messages to deliver two interchangeable images with a scent releasing mechanism linked to the very act of image change by a recipient. The carrier comprises an image changing frame including a still image member with a first image printed on it and a sliding image member with a second image print partially interlaced with the still image member so that a manual sliding action of the still image member brings the two images interchangeably fade in and out laterally through each other. The still image member has a deposit of scent material formed rearward of its visual side.

5 Claims, 7 Drawing Sheets

SCENT RELEASING PICTURE CHANGER

This application is a divisional of Timothy Clegg's parent patent application entitled Scent Releasing Picture Changer publication Ser. No. 11/827,833 filed Jul. 13, 2007 now U.S. Pat. No. 7,918,043.

BACKGROUND OF THE INVENTION

A. Field of the Invention

The present invention relates to a printed material. More particularly, the present invention relates to a message carrier that stimulates the recipients with changing images and an emission of aroma in relation to the changing of images.

B. Description of the Prior Art

U.S. Pat. No. 4,847,124 to Andrieux issued Jul. 11, 1989 provides a sliding microcapsule release between two surfaces with adhesive retaining a rough sandpaper surface and the other having a scented print. When they rub together, the microcapsules burst releasing scent. The preferred embodiment in the patent was a flat paper housing in the shape of a perfume bottle holding an insert that had the scent on the tongue insert. A user slides out the tongue insert, and can smell it.

Meanwhile, there are picture changers known to provide two different graphic images intermeshed so that slight relative movements of the printed substrates show the viewers two complete images in turn on virtually the same plane.

In the field of printing on custom articles to draw heightened attentions for promotional purposes, each of the above devices provided the desired impacts as they were rapidly applied to different medium types imaginable including magazine inserts, handouts and brochures to the point where overcrowded presentations of the same surprise now faded the freshness for quite some time.

Although it is generally understood that the ability to put more attention drawing factors in a single package will provide more casting power of a specific message or information to a broader audience, there have been no suggestions to combine a refreshing aroma and attractive changing pictures in a conveniently portable package.

Therefore, the primary object of the present invention is to provide a multi-message carrier for providing changing views and an appealing scent in a novel combined way to multiply the proven advantages of those conventionally isolated systems of message delivery.

Another object of the present invention is to utilize the same push-pull action that effects visual interchanges on a printed card for bringing aromatic effects thereof to provide an aroma visual multi-message card.

Yet another embodiment of the present invention is to provide an aroma visual multi-message card that is simple and economical to make.

SUMMARY OF THE INVENTION

The aroma visual message card of the present invention enhances the effect of printed messages by using a sliding picture changer as combined with an abrasive scent releasing mechanism in order to make use of the same manual movements for a visual presentation in creating an appropriate aromatic ambiance for a synergetic effect to deliver more positive persuasion into action, which can be of a commercial, social or political nature.

According to a first embodiment of the present invention, a message carrier comprises an image changing frame including a still image member with a first image printed on it and a sliding image member with a second image print partially interlaced with the still image member so that a manual sliding action of the still image member brings the two images interchangeably fade in and out laterally through each other, the still image member having a deposit of scent material formed rearward of its visual side, and the sliding image member having at least one rough surface area on its visual side directly facing the scent deposit of the still image member to scratch and release the scent material to ambiance for a recipient to smell and see a creation of multisensory messages of the images and scent on the spot and; a medium holder adapted to be folded rearward of the visual side of the still image member of the image changing frame, the medium holder having a planar pocket for storing an electronic medium, which may be accessed at a later time through an electronic player to present data supplementary to the multisensory messages.

The image changing frame may be rectangular wherein the still image member is made up of two panels having a number of elongated vanes partially laterally juxtaposed with each other providing a visually singular image of the first image print and the sliding image member is made up of two panels having elongated vanes of the corresponding number and structure to the still image member alternately providing a visually singular image of the second image print, whereby the two image members are permanently interlaced through the vanes as the sliding image member translates along a straight path to show the image prints interchangeably in response to manual activations of the sliding image member by the recipient.

The rough surface area of the sliding image member may have a layer of abrasive particles bonded to rub against the scent material on the opposing surface of the still image member. The material for the abrasive particles is selected from garnet, emery, aluminum oxide, silicon carbide and chromium.

The rough surface area and the scented surface area rub in opposition to release scent. The opposing rough surface area and scented surface area can be interchanged so that the rough surface area is printed on the moving sliding image part or the main carrier portion. Similarly, the scent can be printed on the nonmoving portion, or the sliding image part. The preferred method of printing is to have the rough surface area hidden preferably beneath the sliding image portion on the backside of the sliding image. It is further preferred to have the scent on the printed image that is the nonmoving portion so that a user can smell the scent on the image.

The rough surface area of the sliding image member may comprise punched protrusions of the sliding image member at its areas positioned externally of the image vanes to scrape the scent material. Such punched protrusions of the sliding image member include a concentration of semicircular edges or series of vertical edges protruded to touch the scent material.

Alternatively, the rough surface area of the sliding image member comprises leading edges of the image vanes whereas the still image member has a deposit of scent material formed at directly opposing positions to the path of the sliding image member, whereby the manual sliding motions of the sliding image member have the leading vane edges scrape the scent material.

The medium holder includes a first panel connected to the image changing frame and a second panel depending on the first panel, a sleeve insert sandwiched between the two panels, and an elongated slit entrance formed on the second panel facing the rear side of the image changing frame. The electronic medium includes compact disc and/or data storage of flash memory and various memory cards to be received in the medium holder.

A message carrier of a second embodiment has a rotary type of image changer comprising an image changing frame including a still image slide with a first image printed on it and a turning image slide with a second image print partially interlaced with the still image slide so that manual rotations of the still image slide in either directions bring the two images interchangeably fade in and out radially through each other, the still image slide having a deposit of scent material formed rearward of its visual side, and the turning image slide having at least one rough surface area on its visual side directly facing the scent deposit of the still image slide to scratch and release the scent material to ambiance for a recipient to smell and see a creation of multisensory messages of the images and scent on the spot and; a medium holder adapted to be folded rearward of the visual side of the still image slide of the image changing frame, the medium holder having a planar pocket for storing an electronic medium, which may be accessed at a later time through an electronic player to present data supplementary to the multisensory messages. The image changing frame is at least partially circular and the still image slide is made up of two panels having a number of fanwise vanes partially laterally juxtaposed with each other providing a visually singular image of the first image print and the turning image slide is made up of two circular panels having fanwise vanes of the corresponding number and structure to the still image slide alternately providing a visually singular image of the second image print, whereby the two image slide are permanently interlaced through the vanes as the turning image slide rotates about the still image slide concentrically to show the image prints interchangeably in response to manual rotations of the turning image slide by the recipient.

Embodiments of the invention will now be described by way of example with reference to the accompanying drawings.

BRIEF DESCRIPTION OF THE DRAWINGS

Similar reference numbers denote corresponding features throughout the attached drawings.

DETAILED DESCRIPTION OF THE PREFERRED EMBODIMENT

Figure 1:
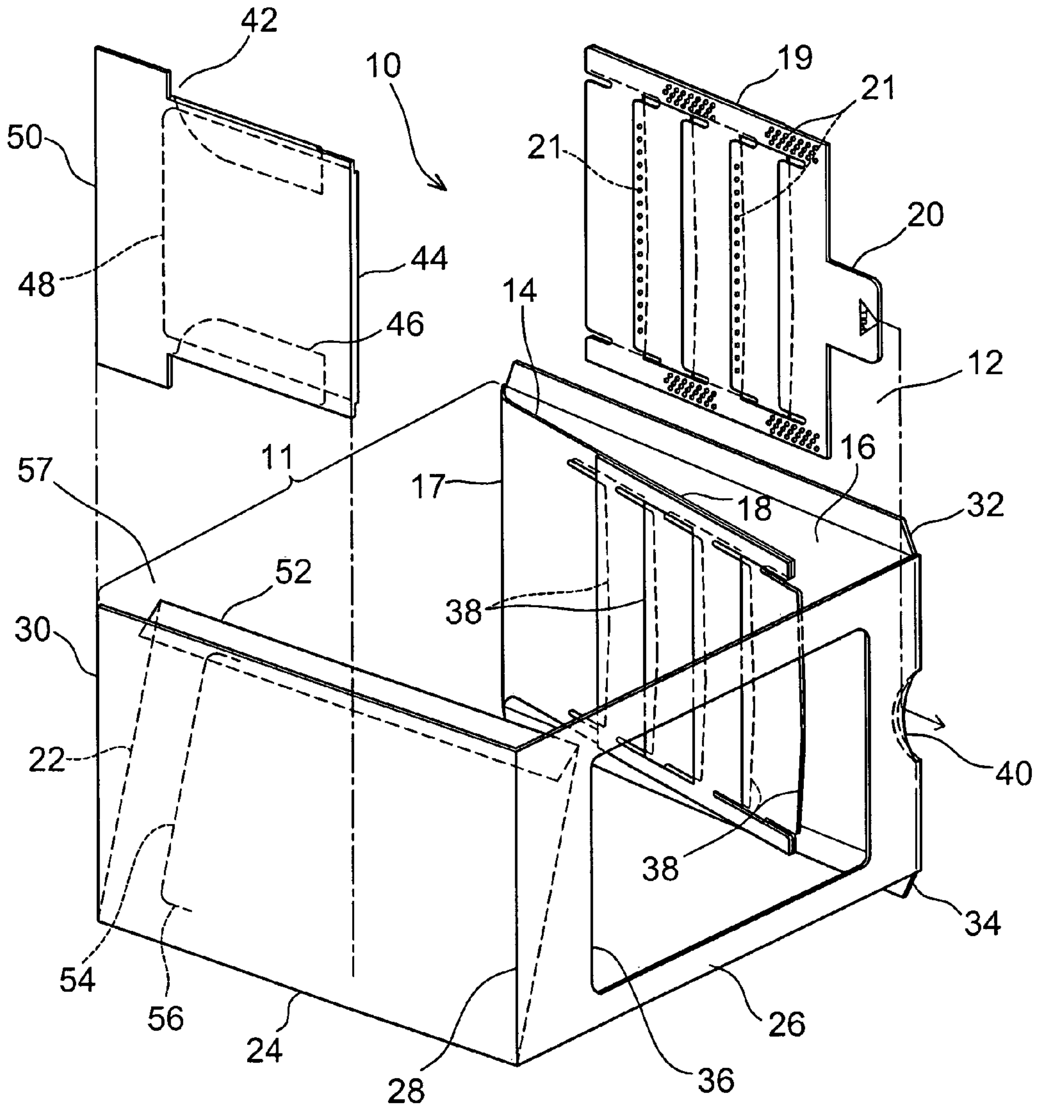
FIG. 1 is a partially exploded perspective view of an aroma visual card according to a first embodiment of the present invention.

With reference to FIG. 1, a message carrier 10 of a first embodiment of the present invention is in the form of a card and comprises an elongated main sheet 11, which is exploded to show four primary folds to provide a rectangular image changing segment 12 formed by an end panel 14 folded over a back panel 16 at a vertical line 17. The end panel 13 provides a base on which a still graphic slide 18 is installed and joined by a moving tab slide 19 with a pulling tab 20. The still slide 18 may be treated with a scent material locally at selected areas while the moving slide 19 has irregular or rough surfaces 21 to scratch the scented areas when the assembled slides 18 and 19 rub each other via the tab 20 during the picture switching operation. There is an opposite panel 22 folded at a horizontal line 24 and a window panel 26 for connecting the image changing segment 12 and panel 22 together.

As stated previously, the tab slide can receive the scented surface instead of the scented surface being printed on the still slide. The opposing rough portion can also be reversed so that it is printed on the still slide instead of on the tab slide.

The message carrier of the present invention can be incorporated in a variety of applications. Some of these applications include, image changing greeting cards, image changing direct mail advertising pieces, and other portable messaging devices. The message carrier is preferably made of paper, but can also be made of plastic or other flexible planar materials.

In order to facilitate manufacturing, the majority of the card 10 may take form by punching a single cardboard, which has been printed on one side with word and pictorial messages. The card 10 has two primary portions folded at a middle line 28, the image changing segment 14 folded at the non-printed side over the window panel 26 being first primary portion while the opposite end panel 22 folded over a cover panel 30 being the second primary portion.

Therefore, the first primary portion comprises three sub-panels of window panel 26, back panel 16 and end panel 14 to which image changing components are assembled before the sub-panels are bonded together at an upper and lower side flaps 32, 34. Multiple cut-outs are made by punching the main sheet 11 to form a large viewing window 36 in the center of the window panel 26, two large C-shaped slots 38 in the end panel 14 and a small round slot 40 across the fold between the back panel 16 and window panel 26.

On the other hand, between the cover panel 30 and end panel 22 a rectangular sleeve insert 42 may be bonded to inner surfaces of the panels near their distal edges. The sleeve insert 42 may be a thin paper pocket with a middle fold line 44 and two side closing flaps 46. An elongated entrance 48 is formed at the remaining side of the insert 42. In order to facilitate correct positioning of the insert 42 between the cover panel 30 and end panel 22, the insert 42 is provided with an enlarged edge 50, which is sized to match the distal end portions of the panels 22, 30 when they are permanently bonded together. An end fold 52 of the end panel 22 helps keep a planar space for the sleeve insert 42 between the panels 22, 30 and provides a smoother edge that is safe to the touch.

An elongated slit 54 with rounded ends 56 is formed in the end panel 22 at a position to cover the entrance 48 of the sleeve insert 42 in position. During assembly, the exterior surfaces of the entrance 48 is bonded to the interior surfaces of the end panel 22 so that lifting the slit 54 will pull open the entrance 48 for a extra data medium such as a compact disc or a data storage like different types of flash memory including a USB memory stick and various memory cards to be received in the insert 42. Thus, a medium holder 57 is completed as it covers the back panel 16 of the image segment 12.

Figure 2A:
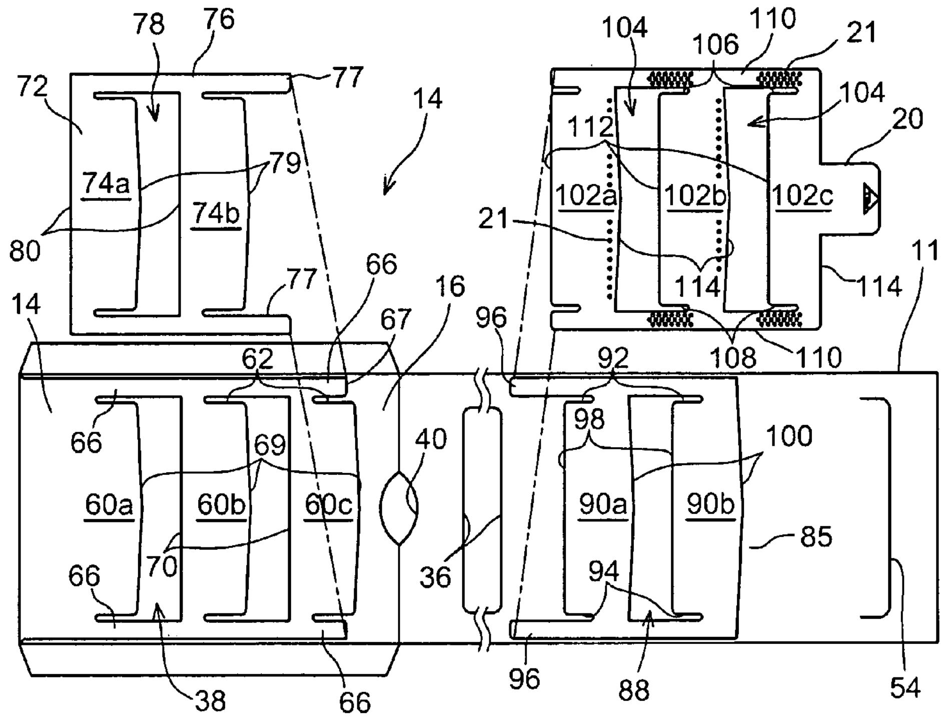
FIG. 2A is a front view of an image-changing segment of the card of FIG. 1 showing the individual components before assembly.
Figure 2B:
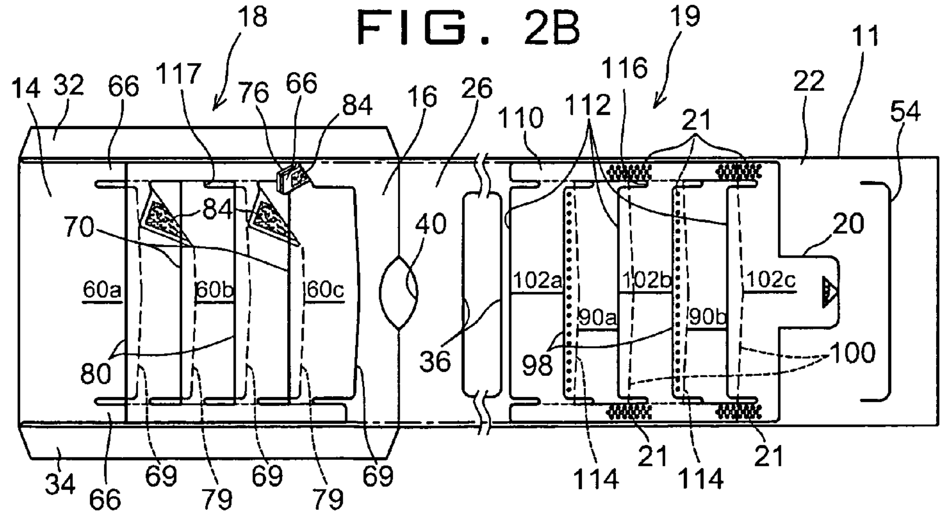
FIG. 2B is a front view of the image segment showing two slide subassemblies are ready to mesh together.

In FIGS. 2A and 2B, the method of making the image segment 12 is more evident. The image-changing segment 12 has a set of two interchangeable images printed, which may be a sequence of related pictures and words or totally unrelated images only sharing the common space. In order to have quick switches between the images, a fade-in/fade-out mechanism is provided wherein the two images advance and retreat through each other at multiple sections across the image surfaces rather than transmitting them from end to end. Referring to the drawings, the end panel 14 of the image segment 12 is shaped to have multiple such as three image vanes 60*a*-60*c* on which a first whole image is printed.

The image vanes 60*a*-60*c* may be made by printing the first image on the end panel 14 as desired and then cut out two C-slots 38 at an interval to provide three evenly spaced vanes 60*a*-60*c*, which are partially connected together at their top 62 and bottom 64 edges by crossbeams 66. The C-slots 38 initially take the C-shape but are inverted as the end panel 14 is folded over the back panel 16 as is shown. Each of the crossbeams 66 is terminated by a distal end 67. The C-slot 38 is defined by a pointed leading edge 69 of the vane 60*a* at the proximal side, a straight trailing edge 70 of the next vane 60*b*, and the top and bottom crossbeams 66 that run in parallel with portions of the top and bottom edges 62, 64 of the vanes 60*a*-60*c*. As is clear from the drawing, the width of the C-slot 38 is smaller than that of the vanes 60*b* or 60*c*.

The C-slots 38 of the end panel 14 are then occupied by an alternate vanes panel 72, which has two image vanes 74*a* and 74*b* similar to the vanes 60*b* and 60*c* of the end panel 14 and two crossbeams 76 with distal ends 77 for alignment with the corresponding portion of the crossbeam 66 of the end panel 14. Between the image vanes 74*a* and 74*b* is formed a C-slot 78, which is bordered by the top and bottom crossbeams 76. Also, the image vanes 74*a*-74*b* have pointed leading edges 79 and straight trailing edges 80. The image printed on the vanes 74*a*-74*b* is registered automatically with the identical image printed on the vanes 60 when the distal ends 67 and 77 are aligned at the bonding process so that there are no visible transitions in the unitary image throughout the assembled panels 14 and 72.

So, the panel 72 is bonded to the panel 14 with their distal ends 67, 77 aligned, as shown in FIG. 2B wherein the pointed leading edges 79 of the vanes panel 72 come to extend under the straight trailing edges 70 of the end panel 14 while the pointed leading edges 69 of the end panel 14 go under the corresponding straight trailing edges 80 of the vanes panel 72. Thus, the two superimposed panels 14 and 72 make the still graphic slide 18 with four invisible vertical slits at the straight edges 70 and 80. Also provided are substantially non-visible overlaps between the vanes 60*a*-60*c* and 74*a*-74*b* extending alternately under the straight edges 70, 80.

On the back of the still graphic slide 18 facing the back panel 16 a scent material 84 may be applied in advance. The coated scent may be directly formed on the graphic slide 18 or it may be carried externally on an adhesive tape, which is then applied to the graphic slide 18. The scent coat 84 is adapted to be scraped by rough moving surfaces to actively emit the scent to the ambient space.

In FIG. 2A, next to the stationary panels 14 and 72 are slide 85 and tab 86 panels joined together as in FIG. 2B to form the moving tab slide 19. The free slide panel 85 resembles the mirror image of the panel 72 but has switched positions of its leading and trailing edges. The slide panel 85 has a second image printed on it and is cut to have a C-slot 88 forming two image vanes 90*a* and 90*b* with top 92 and bottom 94 edges. Crossbeams 96 connect the edges 92, 94 of the panel 85. The vanes 90*a*-90*b* have leading edges 98 and trailing edges 100, which oppose the panel 72 but have their shapes in concert with the leading edges 79 and trailing edges 80 of the panel 72. I.e., the leading edges 98 positioned now at the left side are flat and the trailing edges 100 at right become pointed to provide consistently straight lines throughout the two groups of image splits and to keep the positive engagements between opposing slides 18 and 19 when they are slidably intermeshed.

On the top surface of the slide panel 85, the tab panel 86 is aligned and bonded to make the moving tab slide 19 of FIG. 2B. The tab panel 86 resembles the mirror image of the end panel 14 but has switched positions of its leading and trailing edges. The tab panel 86 also has the second image printed on it and is cut to have three image vanes 102*a*-102*c* with two C-slots 104 formed in between. The image vanes 102*a*-102*c* have top 106 and bottom 108 edges connected by crossbeams 110. The vanes 102*a*-102*c* have leading edges 112 and trailing edges 114 which are shaped in concert with the leading edges 69 and trailing edges 70 of the panel 14 to show consistently straight edges when the slides 18 and 19 are meshed. Specifically, upon bonding the tab panel 86 onto the slide panel 85, the leading edges 98, 112 at the left side are all flat to provide neat straight lines throughout the two groups of image splits and the trailing edges 100, 114 at right become pointed to help keep the positive engagements between the opposing slides 18 and 19 when they are intermeshed.

Figure 3:
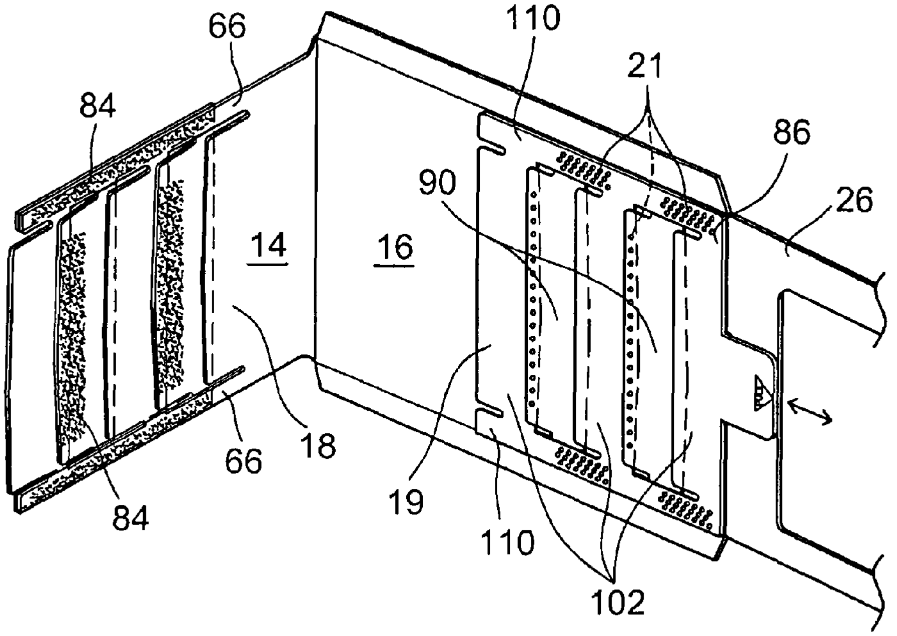
FIG. 3 is a partially exploded perspective view of the aroma visual card with a sliding abrasive surface facing opposite to a printed scent area on the card.

The moving tab slide 19 may have multiple rough surfaces 21 at locations corresponding to scent coat 84 on the still slide 18. FIG. 3 clearly shows the locations of the scent coats 84 on the overall graphic slide 18 with respect to the rough surfaces 21 locally formed on the crossbeams 110 and vanes 102 of the opposite tab panel 86. Although the rough surfaces 21 may thoroughly extend over the crossbeams 110, it is alright to leave some areas spanning the width of one of the image vanes 90*a*-90*c*, 102*a*-102*c* free of the rough surfaces since the moving tab panel 86 covers a distance of about the width of the vane.

Figure 4A:
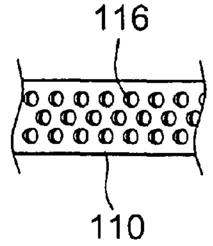
FIGS. 4A to 4C show different forms of the sliding abrasive surface for interacting with the printed scented area to emit the scent.
Figure 4B:
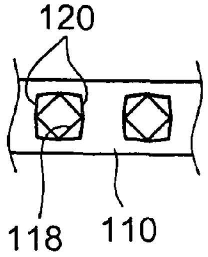

FIG. 4A shows the rough surface made of a pattern of sharp semicircular edges 116 from simply punching the crossbeam 110. An alternative method shown in FIG. 4B is to form two or more bigger flares 118 through the walls of the crossbeam 110 to have raised vertical edges 120 for scraping the scent coat 84 as the tab panel 86 translates horizontally. To increase the abrasive contacts, the crossbeams 110 may be also roughened before the scent coat 84 is applied thereto.

Figure 4C:
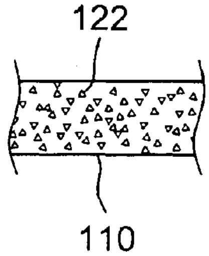

Or, the roughness may be provided using separate materials used to make sandpaper. As shown in FIG. 4C, the crossbeams 110 may be used as a backing on which a layer of abrasive particles 122 is bonded to rub against the scent coat 84. The material for the grit particles may be garnet, emery, aluminum oxide, silicon carbide and chromium oxide as is known in the sandpaper industry. The grit sizes and thus the degree of roughness of the surfaces 21 may be selected from ‘coarse’, ‘medium’ and ‘fine’ with regard to the smoothness of the opposing scent coat 84 to maintain the effective scrapes of the tab slide 86 on the scent coat 84.

The simplest way to activate the aroma message in the card 10 is to use the sharp edges themselves of the image vanes 90*a*-90*b*, and 102*a*-102*b* of the tab slide 19 and deposit a pattern of a scent material on the rear surfaces of the image vanes 74*a*, 74*b*, 60*b*, and 60*c* of the still slide 18 so that the trailing edges 100, 114 of the moving tab slide 19 can scrape the scent deposit to release the aroma.

With reference to FIG. 2B, during assembly of the slides 18 and 19, the leftmost vane 60*a* of the still slide 18 enters a crack fully extending between the leftmost image vane 102*a* and its neighboring vane 90*a* of the moving slide 19 as the next vane 74*a* of the still slide 18 enters a second crack between the same vane 90*a* and the next vane 102*b* of the moving slide 19 and so on until the rightmost image vane 60*c* of the still slide 18 is positioned under the rightmost vane 102*a* of the moving slide 19.

Then, the top and bottom side flaps 32 and 34 are folded over the assembled slides 18 and 19 followed by a closure of the right end panel 22 wrapping about the left end panel 14, whereby the window panel 26 extends over the slides 18, 19 defining a rectangular viewing frame for clearly show the changing pictures on the slides 18 and 19.

Figure 5:
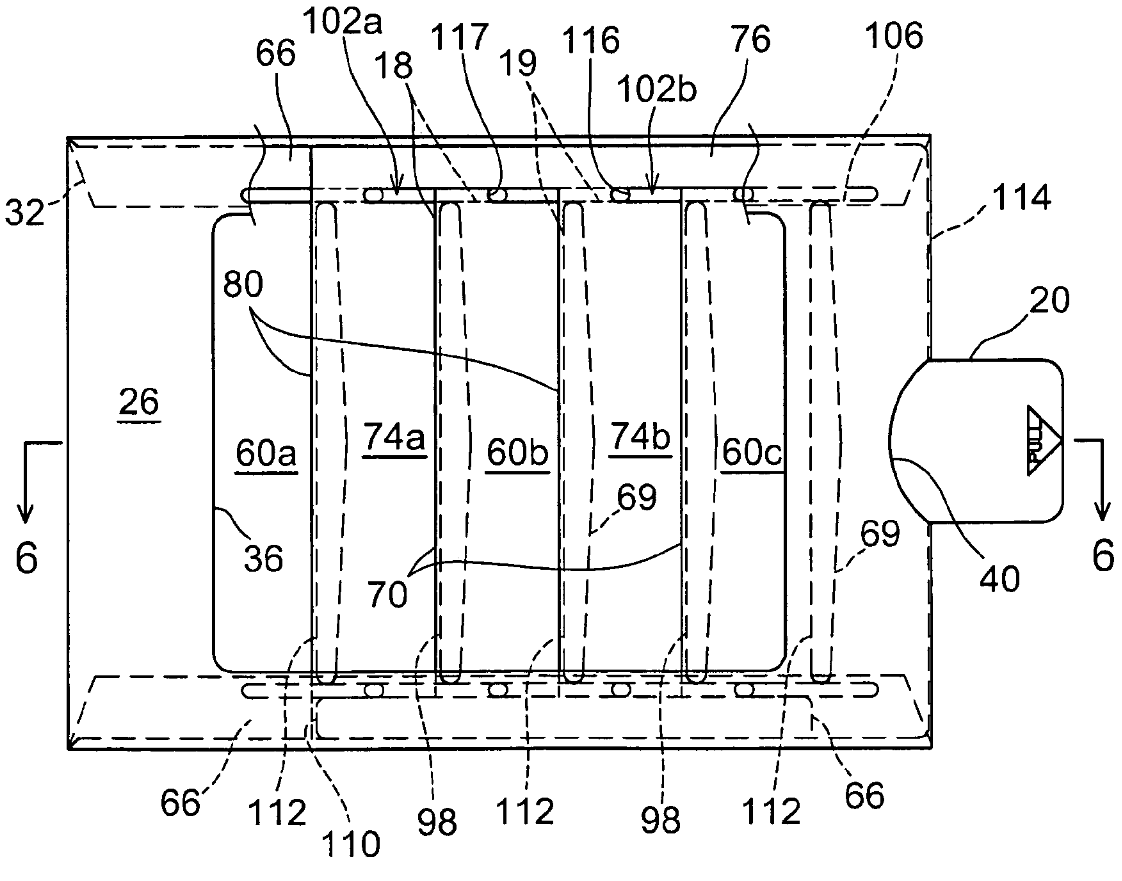
FIG. 5 is a front view of the aroma visual card completed to provide two interchanging images with the image content omitted from the drawing for clarity.
Figure 6:
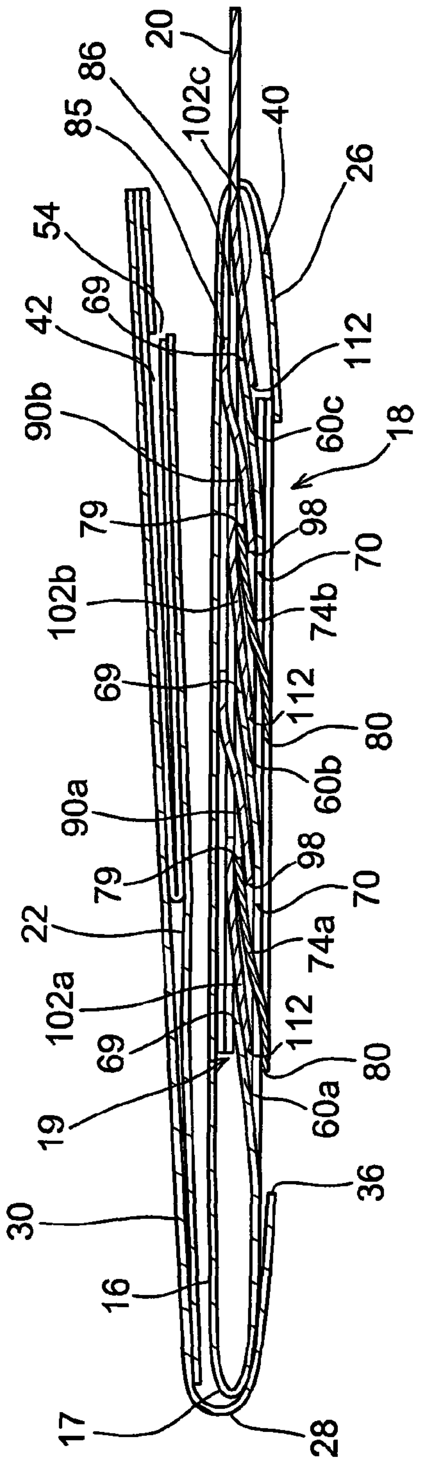
FIG. 6 is a cross sectional view of the card taken along line 6-6 of FIG. 5, which shows the tab slide is fully drawn out to present one set of image vanes to the viewers.

The completed card 10 is shown in the front view of FIG. 5 as well as in the cross sectional view of FIG. 6 wherein the moving tab slide 19 is fully retracted behind the image of the still graphic slide 18. For a viewer, the image vanes 60*a* through 60*c*, 74*a* and 74*b* collectively present the unitary image through the window 36. In this still image mode where the tab 20 is pulled out, the right side edge at 114 of the moving slide 19 abuts inside of the fold line across the slot 40. At the same time, the respective positions of the left side edges 98 and 112 of the moving tab slide 19 have been carefully determined to fall under the left side edges 70 and 80 of the still slide 18 but above the right side edges 79 and 69 of the same. One exception is the left edge 112 of the vane 102*c* that is under the window panel 26. Therefore, the moving slide 19 can be safely hidden under the still slide 18 while maintaining a positive engagement.

Figure 7:
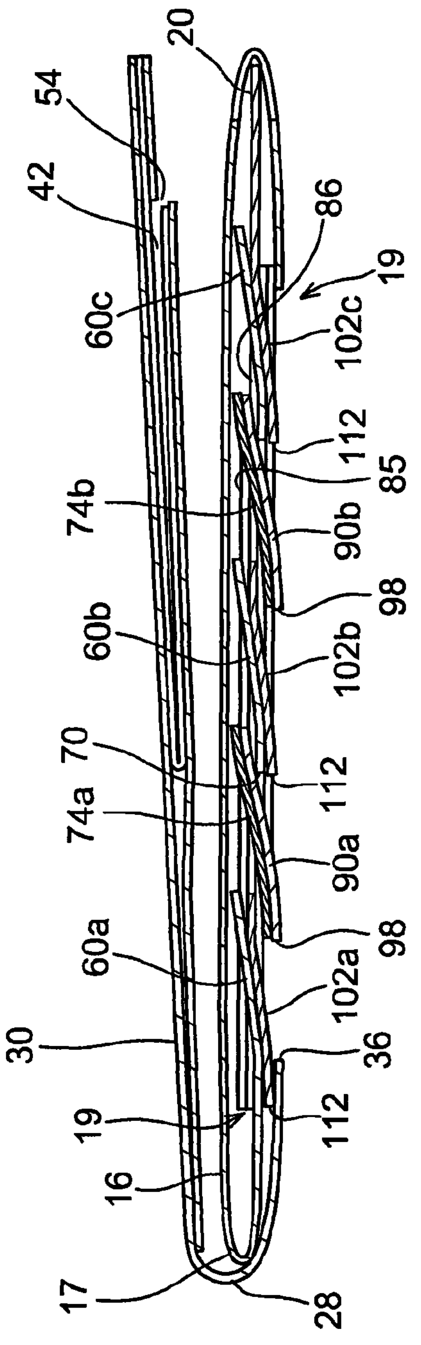
FIG. 7 is a cross sectional view of the card similar to FIG. 6 but with the tab slide pushed in to reveal the other set of image vanes through a fade-in mechanism.

Referring to FIG. 7 showing an image switch mode, pushing the tab 20 inwardly to the left switches the visual presence of the two images but keeps the sliding engagement between the two slides 18 and 19. In particular, the image vanes 90*a*, 90*b* and 102*a* through 102*c* of the moving slide 19 are emerged switching their positions with their counterparts in the still slide 18. The junctions between the image vanes and the crossbeams limit the leftward travel of the moving slide 19. For example, in FIG. 5, the vane 102*b* in the middle of the moving slide 19 has a neck 116 that connects the vane 102*b* to its crossbeam 110 (not visible) and will cross an opposing neck 117 formed on the vane 60*b* in the middle of the still slide 18 when the leading edge 112 of the moving vane 102*b* slides over the trailing edge 70 of the still vane 60*b* as shown in FIG. 7. The crossing of the necks 116 and 118 is ensured due to the position of the vane 102*b* over the front surface of the vane 60*b* as opposed to the crossbeam 110 positioned under the rear surface of the vane 60*b*.

Figure 8:
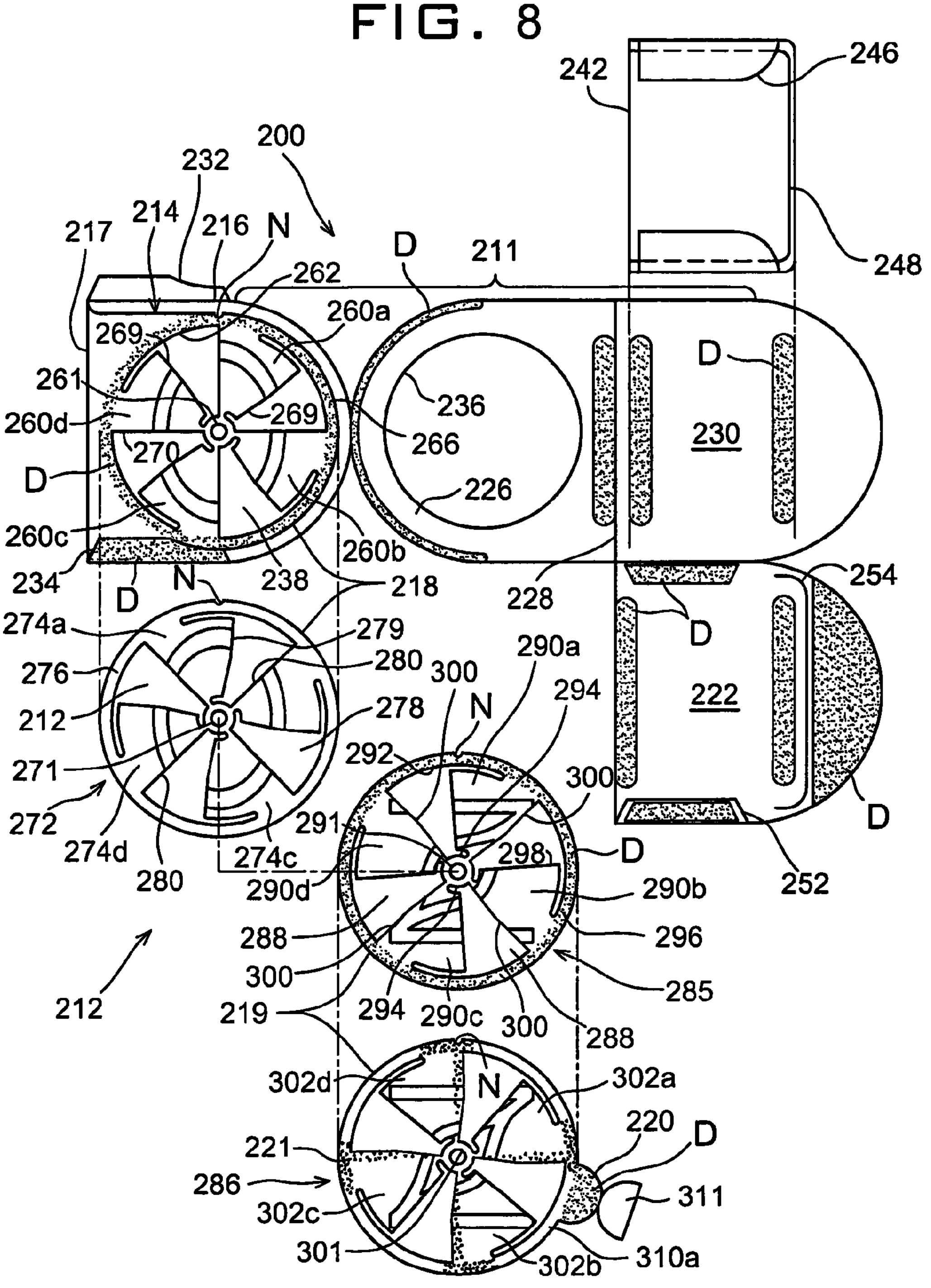
FIG. 8 is an exploded front view of an aroma visual message carrier according to a second embodiment of the present invention having a rotary image-changing segment with an exemplary character of O interchangeable with a stylized Z.

FIG. 8 is an exploded front view of a second embodiment of the present invention wherein an aroma visual message carrier 200 comprises a main sheet 211, a rotary image-changing segment 212, a cover panel 230 and a sleeve insert 242. The main sheet 211 is made by punching a single elongated sheet material to have a smaller end panel 214 that is generally circular but has rectangular proximal edges connected to a slightly bigger back panel 216 at a vertical line 217 along which the two panels 214 and 216 are folded flat. The back panel 216 is solid and connected to a window panel 226, which is substantially the mirror image of the back panel 216 and has a large window 236 for showing a selected area of the end panel 214. Although the window 236 is shown as a single circle punched, it may take varieties of patterns to fit any aesthetical needs as long as it gives the principal images to be interchanged. When the image-changing segment 212 is completed and the window panel 226 is folded over the back panel 216, they are completely juxtaposed. To affix the window panel 226 to the back panel 216, the back panel 216 has top flap 232 shown unfolded and a bottom flap 234 shown folded over the end panel 214. The folded flaps 232, 234 may then be bonded to the opposing surfaces of the window panel 226 to complete the image-changing segment 212.

Connected to the window panel 226 is a cover panel 230 via a straight middle line 228. The cover panel 230 may be conformed to the window panel 226 to cover the same neatly. The cover panel 230 has an identically shaped end panel 222 that can be folded over the cover panel 230 to form a thin pocket for holding a sleeve insert 242, which may be bonded locally to the inner walls of the cover panel 230 as well as the end panel 222 to receive an electronic medium such as a compact disc, USB memory stick or other convenient data storage device. The sleeve insert 242 may comprise two differently sized rectangular plates folded at a vertical edge and two horizontal closing flaps 246 providing an entrance 248 for inserting the medium. To allow access to the sleeve 242 inside the pocket of the panels 222 and 230, a slit 254 is formed on the end panel 222. The cover panel 230 may have markings printed to correctly position the insert 242 with respect to the slit 254 of the end panel 222. With a smaller side of the sleeve 242 bonded to the end panel 222, lifting the slit 254 will crack open the entrance 248 to the sleeve 242 conveniently.

The end panel 222 has an end flap 252 to be folded inside and over the adjacent edge of the sleeve insert 242 and then bonded to the opposing surface of the cover panel 230 to complete a medium storage cover segment of the aroma visual message carrier 200.

To describe the construction of the rotary type image-changing segment 212, the end and back panels 214, 216 become a base for a still slide 218 to which a separate turning slide 219 is assembled.

Figure 9:
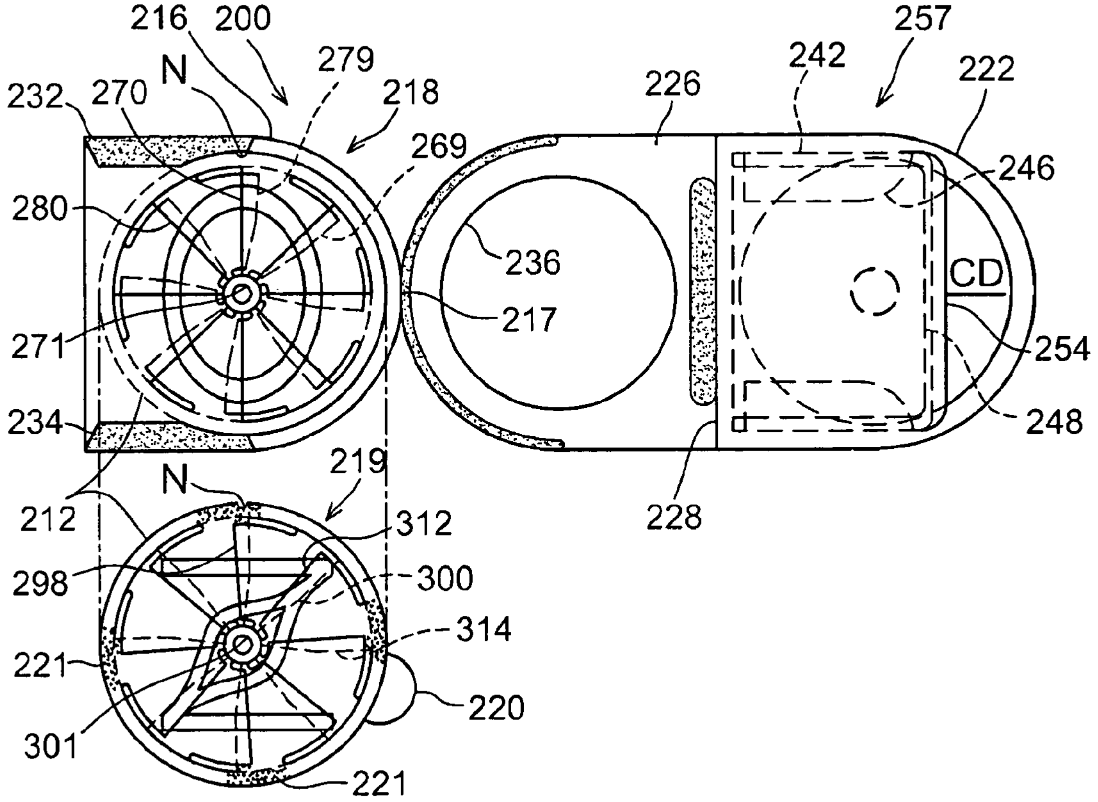
FIG. 9 is a front view of the image segment showing two round graphic slides that are ready to mesh together.

In FIG. 8, end panel 214 and an alternate vanes panel 272 constitute a still image slide 218 and the separate turning slide 219 is comprised of a circular slide panel 285 joined by a tab panel 286 as in FIG. 9. The end panel 214 holds a circular area in which four fanwise image vanes 260*a*-260*d* are formed about a center hole 261. The image vanes 260*a*-260*d* are equally distanced radially and the four vanes make the respective angular distance of 45 degrees between adjacent vanes leaving the same number of fanwise vane slots 238. The number of the vanes and the interposed slots is arbitrary. There may be two or three vanes and the same number of slots. Five or more vanes may be practical when this picture-changing card is made in a much larger scale for getting more attention from more viewers which is a purpose of the inventive card.

Each of the vanes 260*a*-260*d* has a pointed leading edge 269 facing one direction such as clockwise and a straight trailing edge 270 facing the opposite direction or counter-clockwise. Thus, each of the vane slots 238 is bordered radially by a trailing edge 270 of one vane (such as 260*a*) and a leading edge 269 of an immediately following vane (such as 260*d*). Each vane slot is also bordered by a long arcuate edge 262 near the peripheral of the end panel 214 and by a short arcuate edge 264 near the center hole 261. A semicircular crossbeam 266 and the rest of the end panel 214 connect the image vanes 260*a*-260*d*.

An alternate vanes panel 272 is a separate member that is similar to the end panel 214 in that it has four fanwise image vanes 274*a*-274*d*, four fanwise vane slots 278 interposed between the vanes and a center hole 271. Each of the vanes also has a pointed leading edge 279 toward the clockwise direction and a straight trailing edge 280 facing toward the counterclockwise direction. A circular crossbeam 276 connects the image vanes 274*a*-274*d*. But with respect to the longitudinal orientation of the image print of the character "O" in this embodiment, the alternate vanes panel 272 has its image vanes positioned to extend over the respective vane slots 238 of the end panel 214 when the panel 272 is attached to the end panel 214 as shown by the completed still graphic slide 218 in FIG. 9. The rear surface of the crossbeam 276 may be attached to the front surface of the end panel 214 having an amount of bonding material at the corresponding area D as it is aligned with and pressed onto the end panel 214. Throughout FIG. 8 dotted areas D represent suggested patterns of adhesive material for bonding surfaces of the card 200. In order to facilitate the alignment between the end panel 214 and alternate vanes panel 272, they may have registering notches N at the same circumferential position, namely 12 o'clock position. In addition, the rear surfaces of the end panel 214 along a circular track of the crossbeam 266 and the image vanes 260*a*-260*c* have deposits of a scent material applied thereto, not shown. At the subassembly stage shown in FIG. 9, the still slide 218 has the total of eight alternate vanes positioned so that every pointed leading edge extends under its front vane and only the straight trailing edges remain to be visible.

Next, the turning slide 219 has the circular slide panel 285 that resembles the mirror image of the panel 272 of the still slide 218 but has switched positions of its leading and trailing edges. The slide panel 285 has a second image of a stylized "Z" printed on it and is cut to have four fanwise image vanes 290*a*-290*d* formed about a center hole 291. The image vanes 290*a*-290*d* are equally distanced radially by an angular distance of 45 degree resulting in the same number of fanwise vane slots 288. The number of the vanes and the interposed slots corresponds to that of the panel 272.

Each of the vanes 290*a*-290*d* has a pointed leading edge 300 facing the same clockwise direction as the edge 279 of the panel 272 and a straight trailing edge 298 facing the opposite counterclockwise direction. Then, each of the vane slots 288 is bordered radially by a trailing edge 298 of one vane (such as 290*a*) and a leading edge 300 of an immediately following vane (such as 290*d*). Each vane slot is also bordered by a long arcuate edge 292 near the peripheral of the slide panel 285 and by a short arcuate edge 294 near the center hole 291. A circular crossbeam 296 connects the image vanes 290*a*-290*d*.

A tab panel 286 is adapted to join the slide panel 285 to provide the complete image of Z and an intermeshing means with the still slide 218 as shown in FIG. 9. The tab panel 286 generally resembles the mirror image of the end panel 214 in that it has four fanwise image vanes 302*a*-302*d*, four fanwise vane slots 304 interposed between the vanes and a center hole 301. Each of the vanes 302*a*-302*d* also has a pointed leading edge 314 toward the clockwise direction and a straight trailing edge 312 facing toward the counterclockwise direction. A circular crossbeam 310 connects the vanes 302*a*-302*d*.

But with respect to the longitudinal orientation of the image print of the character "Z" in this embodiment, the tab panel 286 has its image vanes radially displaced to extend over the respective vane slots 288 of the slide panel 214 when the panel 286 is attached to the panel 285 to make the turning graphic slide 219. The front surface of the crossbeam 296 may have an annular area D of bonding material applied thereto before it is aligned with and pressed onto the rear surface of the tab panel 286. In addition, the front surface of the tab panel 286 may have deposits of an abrasive material 221 at multiple positions on the crossbeam 310 and the image vanes 302*a*-302*d* in preparation for scraping the scent deposit on the rear surface of the end panel 214.

Alternatively, the abrasive deposits 221 may be omitted and the sharp leading edges 300, 314 of the image vanes 290*a*-290*d*, and 302*a*-302*d* of the turning slide 219 may function to scrape deposits of a scent material formed liberally on the rear surfaces of the image vanes 260*a*-260*d* and 274*a*-274*d* of the still graphic slide 218 in order to release the aroma.

At around 4 o'clock position of the tab panel 286, there is formed an integral tab 220 for providing a grip to rotate the turning slide 219. A depending portion 311 on the tab 220 is for adding the thickness to reinforce the same.

When the two panels 285 and 286 are joined together with their center holes 291 and 301 aligned and the image layers registered, the total of eight alternate vanes are positioned so that every pointed leading edge extends under its forwardly adjacent vane and only the straight trailing edges remain to be visible. In order to facilitate the alignment between the slide panel 285 and tab panel 286 during the bonding process, they may have registering notches N at the same circumferential position.

Then, the subassemblies of the still slide 218 and turning slide 219 are rotationally fastened. First, the turning slide 219 may be positioned behind the still slide 218 with the turning slide 219 oriented as in FIG. 10A. By pushing all eight trailing edges 298, 312 of the turning slide 219 onto the corresponding leading edges 269, 270 of the still slide 218, the image vanes of the two slides 218, 219 will become securely interlaced together.

A prong paper fastener widely used in fastening paper sheets may hold the two slides 218, 219 in a rotational manner. Such fastener has a round head placed on the front surface of the end panel 214 and two parallel prongs threaded through the center holes 261, 271, 301 and 291 before they are deflected away from each other over the rear surface of the slide panel 285. A grommet may be also used to hold the panels 218, 219 together.

FIG. 9 also shows the sleeve insert 242 assembled into a planar pocket space formed by folding the end panel 222 over the cover panel 230 to form a medium holder 257. The medium holder 257 along with the window panel 226 is then wrapped around the image-changing segment 212 about the middle line 228.

Figure 10A:
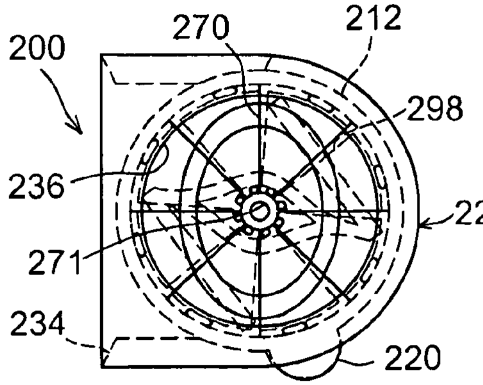
FIGS. 10A and 10B illustrate the operation of the image segment to show the fade-out and fade-in positions of the rotary slide of “Z”, respectively.
Figure 10B:
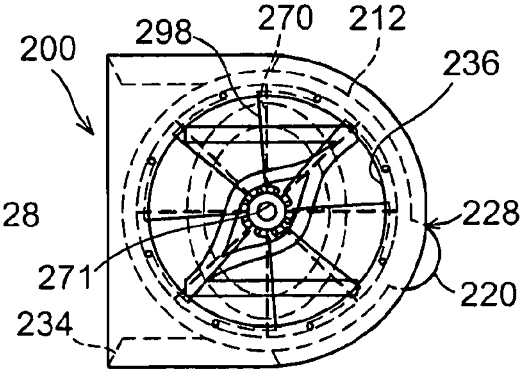

FIG. 10A illustrates the operation of the message card to show the fade-out position of the rotary slide of "Z" with respect to the "O" slide showing the complete "O" appeared through the window 236 whereas in FIG. 10B the slide panel 219 has been turned about 45 degrees counterclockwise to effect the fade-in of image "Z". The angular movement of the tab 311 and thus the slide panel 219 is limited by the tab 311 impeding the middle line 228 between the back panel 216 and window panel 226 at the counterclockwise rotation and the bottom flap 234 of the back panel 216 at the clockwise rotation.

As the new image fades in, the prepared aroma is emitted by the scratching action of the tab slide 219 against scented surfaces of the still slide 218 to provide a multisensory message delivery of the created arrangement of the images and scent. As stated previously, the tab slide can receive the scented surface instead of the scented surface being printed on the still slide. The opposing rough portion can also be reversed so that it is printed on the still slide instead of on the tab slide.

Therefore, while the presently preferred forms of the aroma visual message carrier have been shown and described, and several modifications thereof discussed, persons skilled in this art will readily appreciate that various additional changes and modifications may be made without departing from the spirit of the invention, as defined and differentiated by the following claims.

The invention claimed is:

1. A message carrier comprising:

an image changing frame including a still image slide with a first image printed on it and a turning image slide with a second image print partially interlaced with the still image slide so that rotations of the still image slide in either direction bring the two images interchangeably fading in and out radially;

a deposit of scent material formed between the still image slide and the turning image slide; whereby relative rotation produces image change and scent for a multisensory experience, wherein the rough surface area of the turning image slide has a layer of abrasive particles bonded to rub against the scent material on the opposing surface of the still image slide.

2. A message carrier comprising:

an image changing frame including a still image slide with a first image printed on it and a turning image slide with a second image print partially interlaced with the still image slide so that rotations of the still image slide in either direction bring the two images interchangeably fading in and out radially;

a deposit of scent material formed between the still image slide and the turning image slide; whereby relative rotation produces image change and scent for a multisensory experience, wherein the rough surface area of the turning image slide comprises punched protrusions of the turning image slide at its areas positioned externally of the image vanes to scrape the scent material.

3. A message carrier comprising:

an image changing frame including a still image slide with a first image printed on it and a turning image slide with a second image print partially interlaced with the still image slide so that rotations of the still image slide in either direction bring the two images interchangeably fading in and out radially;

a deposit of scent material formed between the still image slide and the turning image slide; whereby relative rotation produces image change and scent for a multisensory experience;

wherein the punched protrusions of the turning image slide include a concentration of semicircular edges protruded to touch the scent material.

4. A message carrier comprising:

an image changing frame including a still image slide with a first image printed on it and a turning image slide with a second image print partially interlaced with the still image slide so that rotations of the still image slide in either direction bring the two images interchangeably fading in and out radially;

a deposit of scent material formed between the still image slide and the turning image slide; whereby relative rotation produces image change and scent for a multisensory experience;

wherein the punched protrusions of the turning image slide include a series of vertical edges protruded to touch the scent material.

5. A message carrier comprising:

an image changing frame including a still image slide with a first image printed on it and a turning image slide with a second image print partially interlaced with the still image slide so that rotations of the still image slide in either direction bring the two images interchangeably fading in and out radially;

a deposit of scent material formed between the still image slide and the turning image slide; a deposit of scent material formed between the still image slide and the turning image slide; whereby relative rotation produces image change and scent for a multisensory experience;

wherein the rough surface area of the turning image slide comprises leading edges of the image vanes whereas the still image slide has a deposit of scent material formed at directly opposing positions to the path of the turning image slide, whereby the manual rotations of the tuning image slide have the leading vane edges scrape the scent material.

* * * * *